(12) United States Patent
Zhang et al.

(10) Patent No.: US 12,088,871 B2
(45) Date of Patent: Sep. 10, 2024

(54) DISPLAY APPARATUS, VIDEO RECORDING METHOD, AND RECORDED FILE DISPLAY METHOD

(71) Applicant: HISENSE VISUAL TECHNOLOGY CO., LTD., Shandong (CN)

(72) Inventors: Yibing Zhang, Shandong (CN); Hongyan Xu, Shandong (CN); Chang Liu, Shandong (CN); Wenxiao Liu, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 86 days.

(21) Appl. No.: 18/068,363

(22) Filed: Dec. 19, 2022

(65) Prior Publication Data

US 2023/0119233 A1 Apr. 20, 2023

Related U.S. Application Data

(63) Continuation of application No. PCT/CN2021/119563, filed on Sep. 22, 2021.

(30) Foreign Application Priority Data

Dec. 7, 2020 (CN) .......................... 202011435514.1
Dec. 7, 2020 (CN) .......................... 202011439453.6

(51) Int. Cl.
*H04N 21/433* (2011.01)
*H04N 21/431* (2011.01)
(Continued)

(52) U.S. Cl.
CPC ..... *H04N 21/4334* (2013.01); *H04N 21/4316* (2013.01); *H04N 21/4622* (2013.01); *H04N 21/47214* (2013.01)

(58) Field of Classification Search
CPC .......... H04N 21/4334; H04N 21/4316; H04N 21/4622; H04N 21/47214
See application file for complete search history.

(56) References Cited

U.S. PATENT DOCUMENTS

| 5,661,844 A | 8/1997 | Park |
| 9,860,584 B2 * | 1/2018 | Ellis .................... H04N 21/4263 |

(Continued)

FOREIGN PATENT DOCUMENTS

| CN | 101562708 A | 10/2009 |
| CN | 101600090 A | 12/2009 |

(Continued)

OTHER PUBLICATIONS

International Search Report, mailed Nov. 25, 2021, from PCT/US2021/119563.

(Continued)

*Primary Examiner* — Nnenna N Ekpo
(74) *Attorney, Agent, or Firm* — Workman Nydegger

(57) ABSTRACT

Embodiments of the present application provide a display apparatus. The display apparatus includes a display and a controller. The controller is configured to: while the display apparatus is working under a first signal source, present first content from the first signal source; in response to a selection of the video recording application, start a video recording process associated with the first content and monitor recording duration of the video recording process; generate a recording state control with foreground display permission while the display apparatus is connected with any signal source; in response to a source switch request, switch from the first signal source to a second signal source according to the source switch request, present second content from the second signal source, and control the video recording pro- (Continued)

cess to run in the background; and present the recording state control on a display interface with the second content.

18 Claims, 11 Drawing Sheets

(51) Int. Cl.
  *H04N 21/462* (2011.01)
  *H04N 21/472* (2011.01)

(56) References Cited

U.S. PATENT DOCUMENTS

| | | | |
|---|---|---|---|
| 2001/0033736 A1 | 10/2001 | Willey | |
| 2002/0054750 A1 | 5/2002 | Ficco et al. | |
| 2005/0034154 A1* | 2/2005 | Yeh | H04N 5/775 725/38 |
| 2009/0245758 A1 | 10/2009 | Kodama et al. | |
| 2019/0342608 A1* | 11/2019 | Watts | H04N 21/44008 |
| 2021/0176528 A1* | 6/2021 | Kalaichelvan | H04N 21/4622 |

FOREIGN PATENT DOCUMENTS

| | | |
|---|---|---|
| CN | 102547248 A | 7/2012 |
| CN | 103379361 A | 10/2013 |
| CN | 104469392 A | 3/2015 |
| CN | 303841199 S | 9/2016 |
| CN | 107003875 A | 8/2017 |
| CN | 107087226 A | 8/2017 |
| CN | 107678980 A | 2/2018 |
| CN | 107707856 A | 2/2018 |
| CN | 108024079 A | 5/2018 |
| CN | 110007856 A | 7/2019 |
| CN | 110012345 A | 7/2019 |
| CN | 111031177 A | 4/2020 |
| CN | 111163274 A | 5/2020 |
| CN | 111263212 A | 6/2020 |
| CN | 111405313 A | 7/2020 |
| CN | 111526315 A | 8/2020 |
| CN | 112584210 A | 3/2021 |
| WO | 2009150757 A1 | 12/2009 |
| WO | 2015099343 A1 | 7/2015 |
| WO | 2017201980 A1 | 11/2017 |
| WO | 2020238445 A1 | 12/2020 |

OTHER PUBLICATIONS

Chinese First Office Action, mailed Jan. 11, 2022, from Chinese App. No. 202011435514.1.
Chinese Second Office Action, mailed Apr. 27, 2022, from Chinese App. No. 202011435514.1.
Chinese Third Office Action, mailed Sep. 28, 2022, from Chinese App. No. 202011435514.1.

* cited by examiner

DISPLAY APPARATUS, VIDEO RECORDING METHOD, AND RECORDED FILE DISPLAY METHOD

CROSS-REFERENCE OF RELATED APPLICATIONS

The application is a continuation application of International Application No. PCT/CN2021/119563 filed Sep. 22, 2021, which claims the priorities from Chinese Patent Application No. 202011439453.6 filed on Dec. 7, 2020 and Chinese Patent Application No. 202011435514.1 filed on Dec. 7, 2020, which are hereby incorporated by reference in their entirety.

TECHNICAL FIELD

The disclosure relates to the field of display technology, and in particular, to a display apparatus, a video recording method, and a display method for a recorded file.

BACKGROUND

As an important display apparatus in people's home life, television can be used to watch the live Audio and Video (AV) programs from some TV stations and the Video on Demand (VOD) programs on the Internet. While the playing time of a live program is generally fixed, the users cannot watch it again if they miss the playing time.

In the related art, some televisions provide the Personal Video Recorder (PVR) function, and a user can use the PVR function to record a live AV program into a memory connected with the television for later viewing.

SUMMARY

The disclosure provides a display apparatus, including a display and a controller. The controller is configured to: receive a request for video recording input from a user; set a memory with latest registration time among one or more memories in connection with the display apparatus as a target memory in response to the request for video recording; and start video recording, and store a recorded video in the target memory.

BRIEF DESCRIPTION OF THE DRAWINGS

In order to illustrate the technical solutions in the embodiments of the application more clearly, the accompanying figures which need to be used in describing the embodiments will be introduced below briefly. Obviously the accompanying figures described below are only some embodiments of the application, and other accompanying figures can also be obtained by those ordinary skilled in the art according to these accompanying figures without creative labor.

DETAILED DESCRIPTION

In order to make the purposes, embodiments and advantages of the disclosure clearer, the embodiments of the disclosure will be described clearly and completely below in combination with the accompanying drawings in embodiments of the disclosure. Obviously the described embodiments are only some but not all the embodiments.

It should be noted that the brief description of the terms in the disclosure is only for the convenience of understanding the embodiments described hereafter, and is not intended to limit the embodiments of the disclosure. Unless indicated otherwise, these terms should be understood according to the plain and ordinary meanings.

The terms such as "first", "second", etc. in the specification, claims and drawings of the disclosure are used to distinguish similar objects, but not necessarily indicate a particular order or sequence, unless otherwise indicated. It should be understood that the terms used in this way is interchangeable under appropriate circumstances, for example, it can be implemented in an order other than those given in the illustration or description of the embodiments of the disclosure.

The terms "include" and "have" and any variations thereof mean covering but non-exclusive inclusion, for example, a product or device that contains a series of components is not necessarily limited to all components listed clearly, but may include other components not listed clearly or inherent to the product or device.

The term "module" refers to any known or later developed hardware, software, firmware, artificial intelligence, fuzzy logic, or a combination of hardware or/and software codes that can perform the function related to this element.

Figure 1:
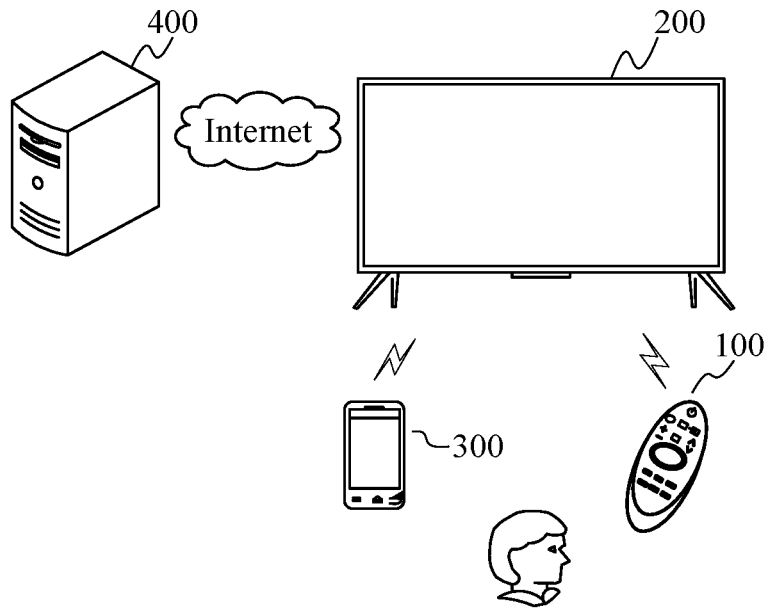
FIG. 1 a schematic diagram of a scenario between a display apparatus and a control device according to some embodiments.

FIG. 1 shows a schematic diagram illustrating a scenario of a display apparatus according to some embodiments. As shown in FIG. 1, the display apparatus 200 can communicate with a server 400, and a user can operate the display apparatus 200 through the mobile terminal 300 or the control device 100.

In some embodiments, the control device 100 may be a remote controller, which includes the infrared protocol communication or Bluetooth protocol communication and other short-range communication methods, etc., and controls the display device 200 wirelessly or by other wired methods. The user may input commands through the keys on the remote controller, voice inputs, control panel inputs, etc. to control the display apparatus 200.

In some embodiments, the smart terminal 300 may include any one of a mobile terminal, a tablet computer, a computer, a laptop computer, an AR/VR device, etc.

In some embodiments, the smart terminal 300 may be used to control the display apparatus 200 via, for example, an application running on the smart terminal.

In some embodiments, the smart terminal 300 may be used to communicate data with the display apparatus.

In some embodiments, the display apparatus 200 may also be controlled in a manner other than the control device 100 and the smart terminal 300. For example, the user's voice command may be directly received by a module for obtaining voice commands configured inside the display apparatus 200, or the user's voice command may be received by a voice control device provided outside the display apparatus 200.

In some embodiments, the display apparatus 200 also communicates data with the server 400. The display apparatus 200 can perform the communication and connection through a Local Area Network (LAN), a Wireless Local Area Network (WLAN), and other networks. The server 400 may provide various contents and interactions to the display apparatus 200. The server 400 may be in one or more clusters, and may include one or more types of servers.

In some embodiments, the software steps executed by one execution entity may be migrated to another execution entity that communicates data therewith for execution as required. Exemplarily, the software steps executed by the server may be migrated to the display apparatus that communicates data therewith for execution as required, and vice versa.

Figure 2:
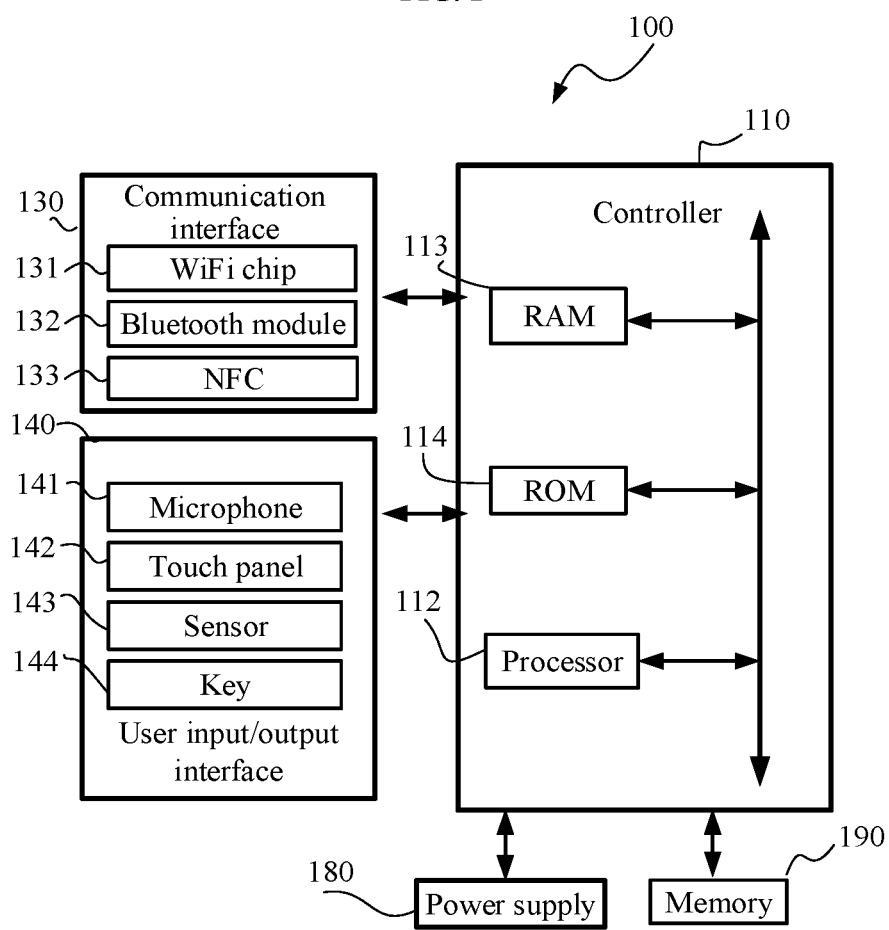
FIG. 2 shows a block diagram of the hardware configuration of the display apparatus 200 according to some embodiments.

FIG. 2 shows a configuration block diagram of the control device 100 according to an embodiment. As shown in FIG. 2, the control device 100 includes a controller 110, a communication interface 130, a user input/output interface 140, a memory 190, and a power supply 180. The control device 100 may receive an input operation command from a user and convert the operation command into an instruction that can be recognized and responded by the display apparatus 200, playing an intermediary role between the user and the display apparatus 200.

In some embodiments, the communication interface 130 is configured to communicate with external devices, and includes at least one of a WIFI chip, a Bluetooth module, an NFC or alternative module.

In some embodiments, the user input/output interface 140 includes at least one of a microphone, a touch panel, a sensor, a key or an alternative module.

Figure 3:
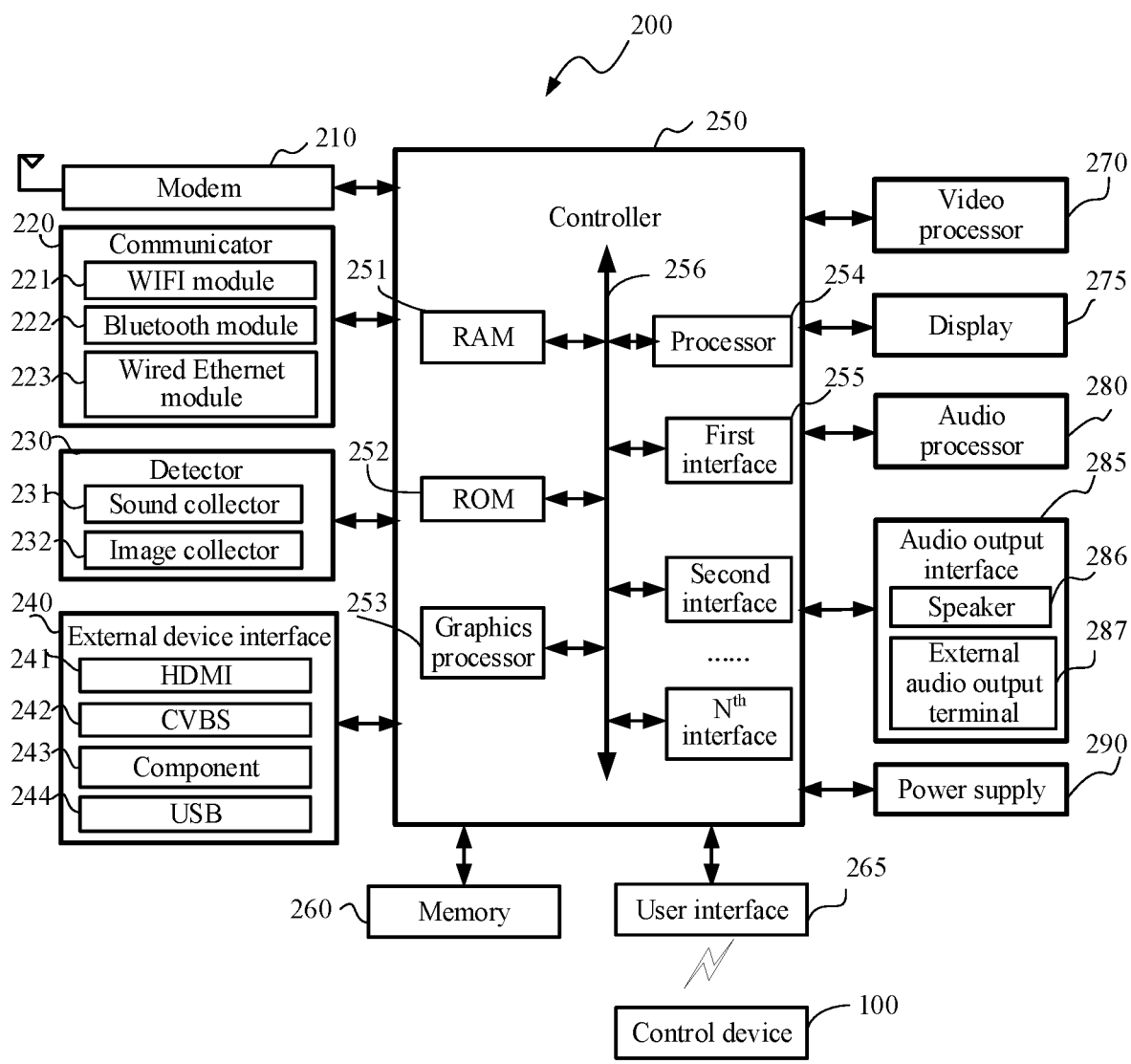
FIG. 3 shows a block diagram of the hardware configuration of the control device 100 according to some embodiments.

FIG. 3 shows a block diagram of the hardware configuration of the display apparatus 200 according to an embodiment.

In some embodiments, the display apparatus 200 includes at least one of a modem 210, a communicator 220, a detector 230, an external device interface 240, a controller 250, a display 275, an audio output interface 285, a memory, a power supply, and a user interface.

In some embodiments, the controller includes a central processing unit, a video processor, an audio processor, a graphics processor, an RAM, an ROM, and first to $n^{th}$ interfaces for input/output.

In some embodiments, the display 275 includes: a panel component for presenting an image, a driver element for driving the image display, a component for receiving an image signal output from the controller to display the video content and image content as well as a menu control interface, and a UI interface for user interaction, etc.

In some embodiments, the display 275 may include at least one of a liquid crystal display, an OLED display and a projection display, and may also include a projection device and a projection screen.

In some embodiments, the modem 210 receives the broadcast television signals in a wired or wireless manner, and demodulates audio and video signals, such as EPG data signals, from a plurality of wireless or wired broadcast television signals.

In some embodiments, the communicator 220 is a component in communication with an external device or an external server according to various types of communication protocols. For example, the communicator may include at least one of a Wifi module, a Bluetooth module, a wired Ethernet module, other network communication protocol chip or near-field communication protocol chip, and an infrared receiver. The display apparatus 200 may establish the sending and receiving of control signals and data signals with the control device 100 or the server 400 through the communicator 220.

In some embodiments, the detector 230 is configured to collect signals from external environment or outside interaction. For example, the detector 230 includes a light receiver, which is a sensor configured to collect the intensity of the ambient light; or the detector 230 includes an image collector, such as a camera, which may be configured to collect external environment scenes, user attributes or user interaction gestures; or the detector 230 includes a sound collector, such as a microphone, which is configured to receive external sounds.

In some embodiments, the external device interface 240 may include, but is not limited to, any one or more of a High-Definition Multimedia Interface (HDMI), an analog or data high-definition component input interface (Component), a Composite Video Broadcast Signal (CVBS) input interface, a USB input interface (USB), an RGB port. The external device interface 240 may also be a composite input/output interface formed of a plurality of interfaces described above.

In some embodiments, the controller 250 and the modem 210 may be located in separate devices, that is, the modem 210 may be located in an external device (such as an external set-top box, etc.) of the main device where the controller 250 is located.

In some embodiments, the controller 250 controls the operations of the display apparatus and responds to the user's operations through various software applications stored in the memory. The controller 250 controls the overall operation of the display apparatus 200. For example, in response to receiving a user command for selecting a UI object displayed on the display 275, the controller 250 may perform the operations related to the object selected by the user command.

In some embodiments, the object may be any one of selectable objects, e.g., hyperlink, icon or other operable control. The operations related to the selected object include: the operation of displaying the link to the hyperlink page, document, image or the like, or the operation of launching an application corresponding to the icon.

In some embodiments, the controller includes at least one of a Central Processing Unit (CPU), a video processor, an audio processor, a Graphics Processing Unit (GPU), an RAM (Random Access Memory), an ROM (Read-Only Memory), first to $n^{th}$ interfaces for input/output, a communication bus (Bus), etc.

The CPU processor is used to run the operating system and application instructions stored in the memory, and run various applications, data and content according to various interactive instructions received from the outside, so as to finally display and play various audio and video contents. The CPU processor may include a plurality of processors, for example, include a main processor and one or more sub-processors.

In some embodiments, the graphics processor is used to generate various graphics objects, such as icons, operation menus, graphics for user commands input, etc. The graphics processor includes: an arithmetic unit that performs operations by receiving various interactive commands input from users and displays various objects according to the display attributes, and a renderer that renders various objects obtained based on the arithmetic unit and displays the rendered objects on the screen.

In some embodiments, the video processor is used to receive an external video signal and perform at least one of decompression, decoding, scaling, noise reduction, frame rate conversion, resolution conversion, image synthesis and other video processing according to the standard codec protocol of the input signal, to obtain a signal that can be displayed or played directly on the display apparatus 200.

In some embodiments, the video processor includes at least one of a de-multiplexing module, a video decoding module, an image synthesis module, a frame rate conversion module, a display formatting module, etc. Here, the de-multiplexing module is used to de-multiplex an input audio and video data stream. The video decoding module is used to process the demultiplexed video signal, including decoding and scaling, etc. The image synthesis module, such as image synthesizer, is used to superimpose and mix a GUI signal generated by a graphics generator itself or according to the user input with the scaled video image, to generate an image signal for display. The frame rate conversion module is used to convert the frame rate of the input video. The display formatting module is used to change the received video output signal after the frame rate conversion to a signal conforming to the display format, e.g., output an RGB data signal.

In some embodiments, the audio processor is used to receive an external audio signal, and perform at least one of decompression, decoding, noise reduction, digital-to-analog conversion and amplification, etc. according to the standard codec protocol of the input signal, to obtain a sound signal that can be played in the speaker.

In some embodiments, the user may input a command on the Graphical User Interface (GUI) presented on the display 275, and the user input interface receives the command through the Graphical User Interface (GUI). Alternatively, the user may input a command by inputting the particular sound or gesture, and the user input interface recognizes the sound or gesture through the sensor to receive the command.

In some embodiments, the "user interface" is a medium interface for interaction and information exchange between applications or operating systems and users. It realizes the conversion between the internal form of information and the form acceptable to users. The commonly-used form of the user interface is Graphic User Interface (GUI), which refers to a user interface related to computer operations that is displayed in a graphical manner. It may include an interface element such as an icon, window, control or the like presented in the display screen of an electronic device, and the controls may include at least one of icon, button, menu, tab, text box, dialog box, state bar, navigation bar, Widget, and other visual interface elements.

In some embodiments, the user interface 265 may be an interface for receiving a command input (for example: physical buttons on the display apparatus body, or others).

In some embodiments, the system of the display apparatus may include a Kernel, a command parser (shell), a file system and one or more applications. The kernel, shell and file system together construct a basic operating system structure, and allow users to manage files, run programs and use the system. After power-on, the kernel starts, activates the kernel space, abstracts hardware, initializes hardware parameters or others, and runs and maintains the virtual memory, scheduler, signals and Inter-Process Communication (IPC). After the kernel starts, the shell and the user applications are loaded. The applications are compiled into machine codes after startup, to form a process.

Figure 4:
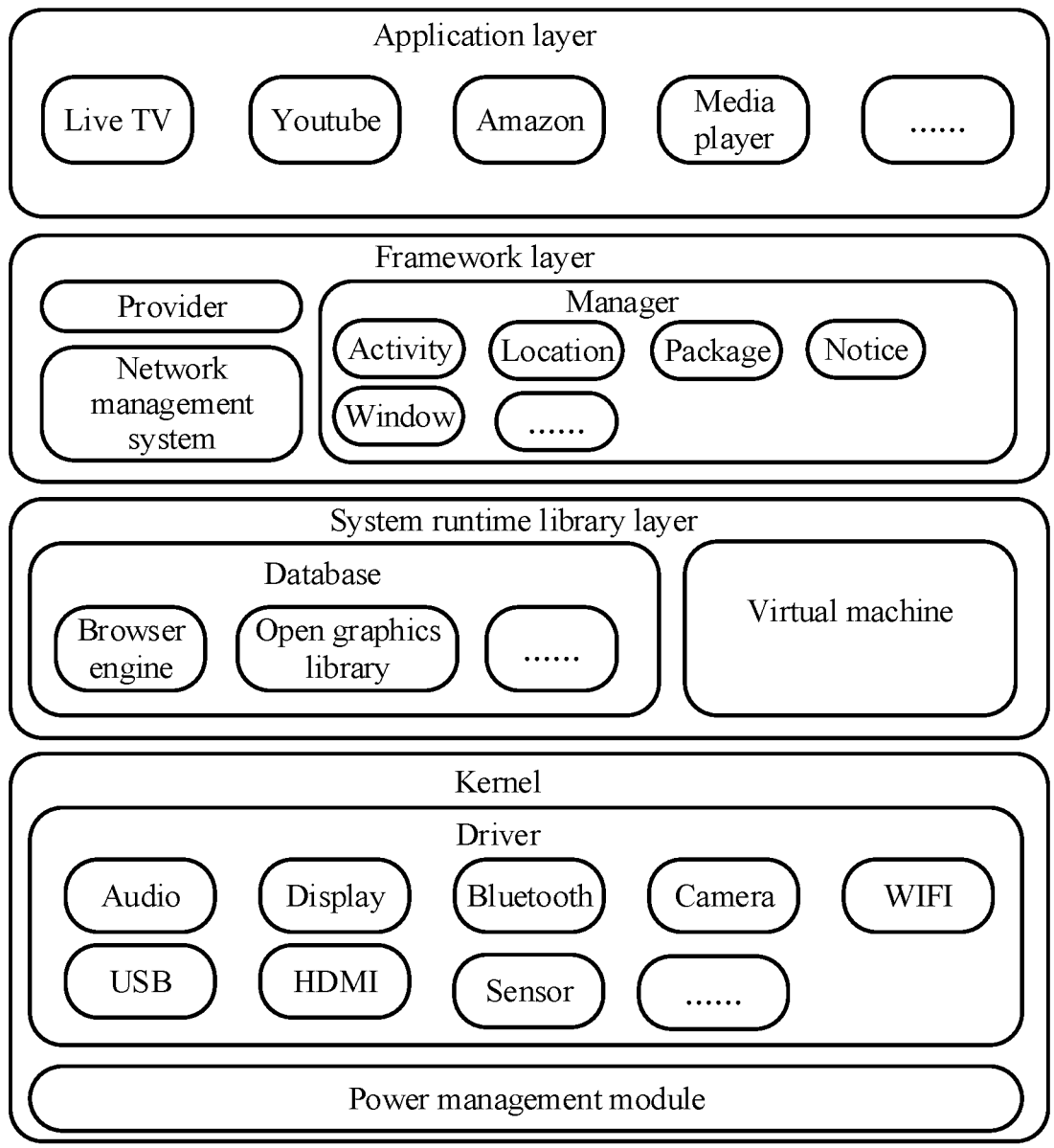
FIG. 4 shows a schematic diagram of the software configuration in the display apparatus 200 according to some embodiments.

Referring to FIG. 4, in some embodiments, the system is divided into four layers, which are, from top to bottom, an applications layer (referred to as "application layer" for short), an application framework layer (referred to as "framework layer" for short), an Android runtime and system library layer (referred to as "system runtime library layer" for short), and a kernel layer.

In some embodiments, at least one application runs in the application layer, and these applications may be a Window application, a system setting application or a clock application that comes with the operating system; or may be applications developed by the third-party developers. In some embodiments, the applications in the application layer include but not limited to the above examples.

The framework layer provides an Application Programming Interface (API) and a programming framework for the applications of the application layer. The application framework layer includes some predefined functions. The application framework layer serves as a processing center, which decides how the applications in the application layer run. The applications can access the resources in the system and obtain the services of the system during running through the API interface.

As shown in FIG. 4, the application framework layer in the embodiments of the disclosure includes a manager, a content provider, etc., where the manager includes at least one of: an Activity Manager for interacting with all activities running in the system; a Location Manager for providing system services or applications with access to system location services; a Package Manager for retrieving various information related to application packages currently installed on the device; a Notification Manager for controlling the display and removal of notification messages; a Window Manager for managing icons, windows, toolbars, wallpapers and Desktop widget on the user interface.

In some embodiments, the activity manager is used to manage the life cycle of each application and the general navigation back function, such as controlling exit, opening, back, etc. of the application. The window manager is used to manage all the window applications, for example, obtain the size of the display screen, determine whether there is a status bar, lock the screen, capture the screen, control the change of the display window (for example, scaling the display window, dithering display, deformation display, etc.), etc.

In some embodiments, the system runtime library layer provides support for the upper layer, that is, the framework layer. When the framework layer runs, the Android operating system will run the C/C++ library included in the system runtime library layer to realize the function to be implemented by the framework layer.

In some embodiments, the kernel layer is a layer between hardware and software. As shown in FIG. 4, the kernel layer includes at least one of: audio driver, display driver, Bluetooth driver, camera driver, WIFI driver, USB driver, HDMI driver, sensor driver (such as fingerprint sensor, temperature sensor, pressure sensor, etc.), and power driver, etc.

The hardware or software architecture in some embodiments may be based on the discussion in the foregoing embodiments, and may be based on other similar hardware or software architectures in some embodiments, as long as the technical solution of the disclosure can be implemented.

In some embodiments, a video recording application may be installed on the display apparatus to implement the video recording function, and the video recording application may be a Personal Video Recorder (PVR), which provides the PVR recording function. In order to prevent video files from occupying a large amount of storage space of the display apparatus, the PVR may store the recorded video files in a memory in connection with the display apparatus, and the memory may be a magnetic disk or other storage device. The disclosure takes a magnetic disk as an example for discussion. When the display apparatus uses a new magnetic disk to store recorded files, the magnetic disk needs to be registered to check whether the performance of the magnetic disk meets the requirements for storing recorded files. In some embodiments, the user may have a plurality of magnetic disks for storing recorded files. When the display apparatus is connected with a plurality of magnetic disks simultaneously, the display apparatus selects the magnetic disk inserted first as the magnetic disk corresponding to the PVR. However, under normal circumstances, the magnetic disk inserted first is often not the magnetic disk that the user wants to use.

Figure 5:
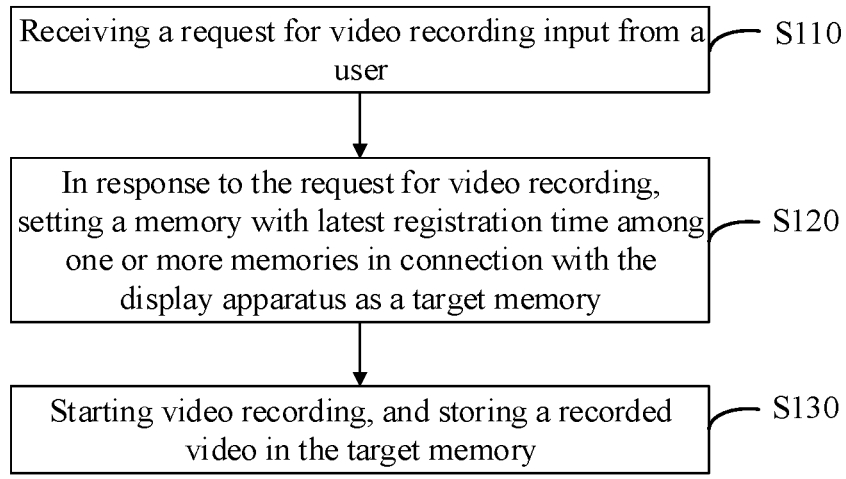
FIG. 5 shows a schematic flowchart of a video recording method according to some embodiments.

In view of the above technical problem, based on that a memory needs to register when a display apparatus performs video recording, an embodiment of the disclosure provides a video recording method. Referring to FIG. 5, the method may include the following steps.

S110: receiving a request for video recording input from a user.

In some embodiments, the request for video recording may be a request generated by a command to start a video recording application. The user inputs a command to open the PVR application on the display apparatus, and the display apparatus may generate the request for video recording according to the command to open the PVR application.

S120: in response to the request for video recording, setting a memory with latest registration time among one or more memories in connection with the display apparatus as a target memory.

In some embodiments, a memory has been connected with the display apparatus before receiving the request for video recording, and in this case, the display apparatus may directly use the this memory as the target memory for video recording.

In some embodiments, a plurality of memories have been connected with the display apparatus before receiving the request for video recording, and in this case, the display apparatus may select one of the memories as the target memory for video recording.

Figure 6:
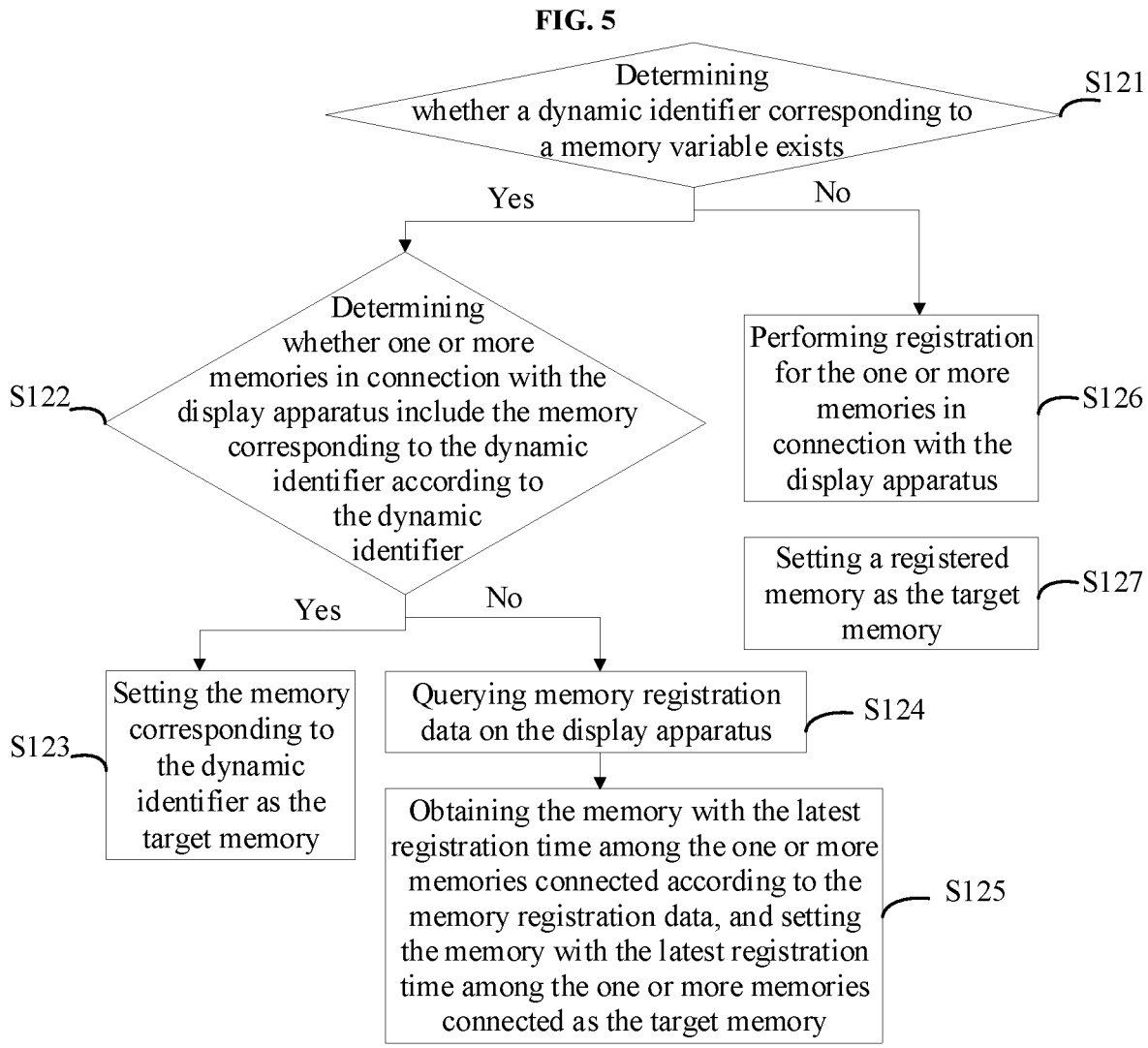
FIG. 6 shows a schematic flowchart of a method for setting a target memory according to some embodiments.

In some embodiments, in order to optimize the user experience, the method for setting a target memory by the display apparatus may, referring to FIG. 6, include steps S121-S127.

S121: in response to the request for video recording, determining whether a dynamic identifier corresponding to a memory variable exists, and the memory variable is configured to update the dynamic identifier according to registration of memories on the display apparatus in such a way that a memory with the dynamic identifier is a memory with the latest registration time on the display apparatus.

In some embodiments, the display apparatus is configured with a memory variable, which may implement as a value of the dynamic identifier. If no memory has been registered on the display apparatus, the dynamic identifier is null. In response to a memory, such as magnetic disk A, being registered on the display apparatus, the memory variable obtains the identifier of the memory, such as Universally Unique Identifier (UUID) of magnetic disk A, and the dynamic identifier is set as the identifier of this memory, that is, the value of the memory variable is equal to the ID of the magnetic disk A. In response to a new memory, such as magnetic disk B, being registered on the display apparatus, the dynamic identifier is updated to the identifier of this memory, that is, the value of the memory variable is equal to the UUID of the magnetic disk B. In this case, the memory variable only includes the identifier of the magnetic disk B, and does not include the identifier of the memory A. According to the above configuration, the memory variable may be null, or include an identifier of the memory with the latest registration time on the display apparatus.

In some embodiments, the identifier of the memory registered on the display apparatus may not be actively obtained for the memory variable, and the controller of the display apparatus updates the dynamic identifier in the memory variable to the identifier of the latest registered memory after the memory registration.

In some embodiments, the memory variable may be stored in a preset path under the controller of the display apparatus.

S122: in response to that the dynamic identifier corresponding to the memory variable exists, determining whether one or more memories in connection with the display apparatus include the memory corresponding to the dynamic identifier according to the dynamic identifier.

In some embodiments, there are one or more memories which have been registered on the display apparatus, and the value of the memory variable is the identifier of the latest registered memory on the display apparatus. The controller of the display apparatus obtains the identifier of the latest registered memory on the display apparatus by obtaining the value of the memory variable.

In some embodiments, there may be one or more memories which have connected with the display apparatus. The one or more memories connected may include the latest registered memory on the display apparatus, or may not include the latest registered memory on the display apparatus. The controller of the display apparatus may compare the identifiers of the one or more memories connected with the value of the memory variable. In response to a memory connected being consistent with the value of the memory variable, it is determined that the one or more memories connected include the latest registered memory on the display apparatus, otherwise, it is determined that the one or more memories connected do not include the latest registered memory on the display apparatus.

S123: in response to the one or more memories connected including the memory corresponding to the dynamic identifier, setting the memory corresponding to the dynamic identifier as the target memory.

In some embodiments, in response to the one or more memories connected including the memory corresponding to the dynamic identifier, the memory corresponding to the dynamic identifier is set as the storage path of the video recording application on the display apparatus, so that the memory corresponding to the dynamic identifier becomes the target memory of the video recording application.

S124: in response to the one or more memories connected not including the memory corresponding to the dynamic identifier, querying memory registration data on the display apparatus.

In some embodiments, the display apparatus may store memory registration data, which may be stored in the form of a descriptive table for memory registration. Each time a memory is registered on the display apparatus, the controller of the display apparatus may note the registration time of this memory and the memory identifier of this memory in the descriptive table for memory registration.

In some embodiments, the display apparatus may set a log file for indicating user's operation, and the controller of the display apparatus may store some operation records of the user on the display apparatus in this log file, and the user operations include registration of a memory.

In some embodiments, in response to the request for video recording, the controller of the display apparatus may query the memory variable under the preset path, and if the value of the memory variable is null, the controller may search the descriptive table for memory registration, to obtain the identifier and the registration time of the memory registered on the display apparatus.

In some embodiments, in response to the request for video recording, the controller of the display apparatus may query the memory variable under the preset path, and if the value of the memory variable is null, it may search the log file for indicating user's operations, to obtain the identifier and the registration time of the memory registered on the display apparatus.

S125: obtaining the memory with the latest registration time among the one or more memories connected according to the memory registration data, and setting the memory with the latest registration time among the one or more memories connected as the target memory.

In some embodiments, the display apparatus may match the identifiers of the one or more memories in connection with the display apparatus with the identifiers of the memories in descriptive table for memory registration to obtain the registration times of the one or more memories in connection with the display apparatus, sort the registration times of the one or more memories connected, and set the memory with the latest registration time as the target memory.

In some embodiments, the display apparatus may match the identifiers of the one or more memories in connection with the display apparatus with the identifiers of the memories in the log file for indicating user's operation to obtain the registration times of the one or more memories in connection with the display apparatus, sort the registration times of the one or more memories in connection with the display apparatus, and set the memory with the latest registration time as the target memory.

S126: in response to the request for video recording and the dynamic identifier corresponding to the memory variable not existing, performing registration for the one or more memories in connection with the display apparatus, where the memory variable is configured to update the dynamic identifier according to registration of memories on the display apparatus in such a way that a memory with the dynamic identifier is a memory with the latest registration time on the display apparatus.

In some embodiments, if the value of the memory variable is null, the dynamic identifier does not exist, meaning that no memory has been registered on the display apparatus. In this case, a registration interface may be presented, and the user may register the memories which have connected with the display apparatus in the registration interface.

In some embodiments, if the number of memories which have connected with the display apparatus is one, this memory may be directly registered; in some embodiments, if the number of memories connected with the display apparatus is multiple, the registration interface may be entered, and the user may select one of the memories for registration in the registration interface, for example, select the memory newly inserted into the display apparatus for registration.

Figure 7:
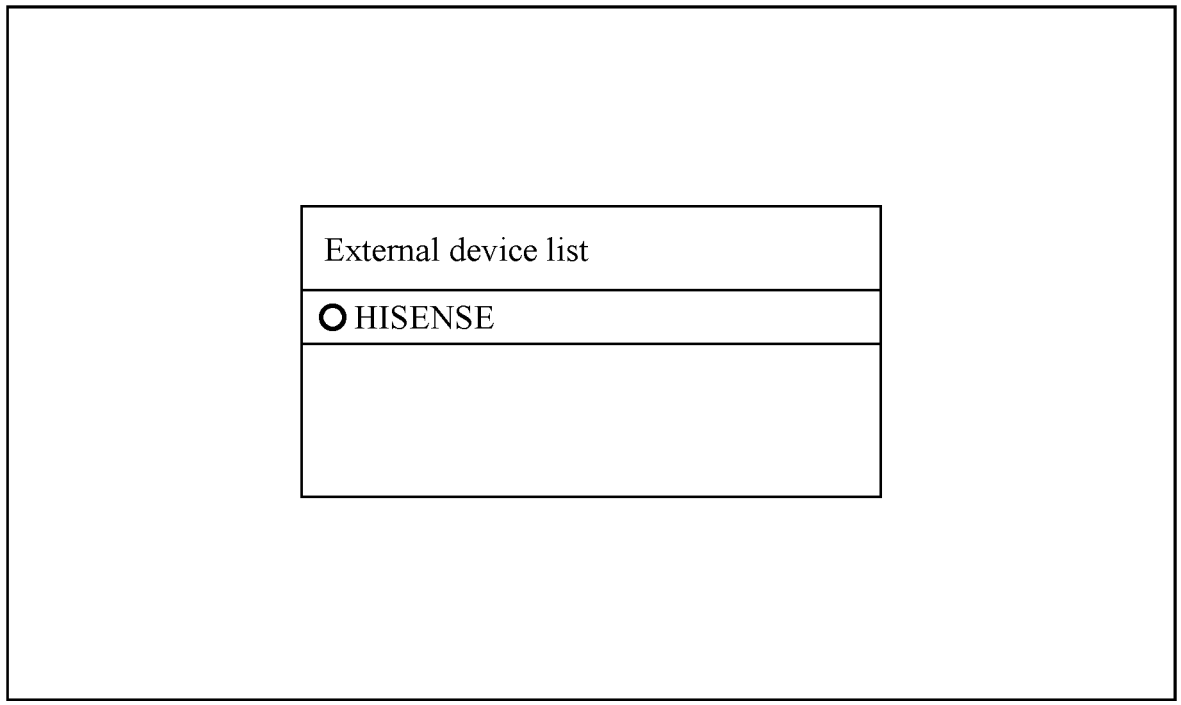
FIG. 7 shows a schematic diagram of a registration interface of a memory according to some embodiments.

In some embodiments, the disk registration interface on the display apparatus may refer to FIG. 7. As shown in FIG. 7, the disk registration interface may display a list of external device(s). In FIG. 7, the list shows a name of a memory, indicating that the number of memories connected with the display apparatus at this time is one, and for example, the name of the memory is "HISENSE".

In some embodiments, when there is only one memory name in the list of external device(s), the user may press the OK key on the remote control to input a command for disk registration to the display apparatus, and the display apparatus registers the memory in response to the command for disk registration.

Figure 8:
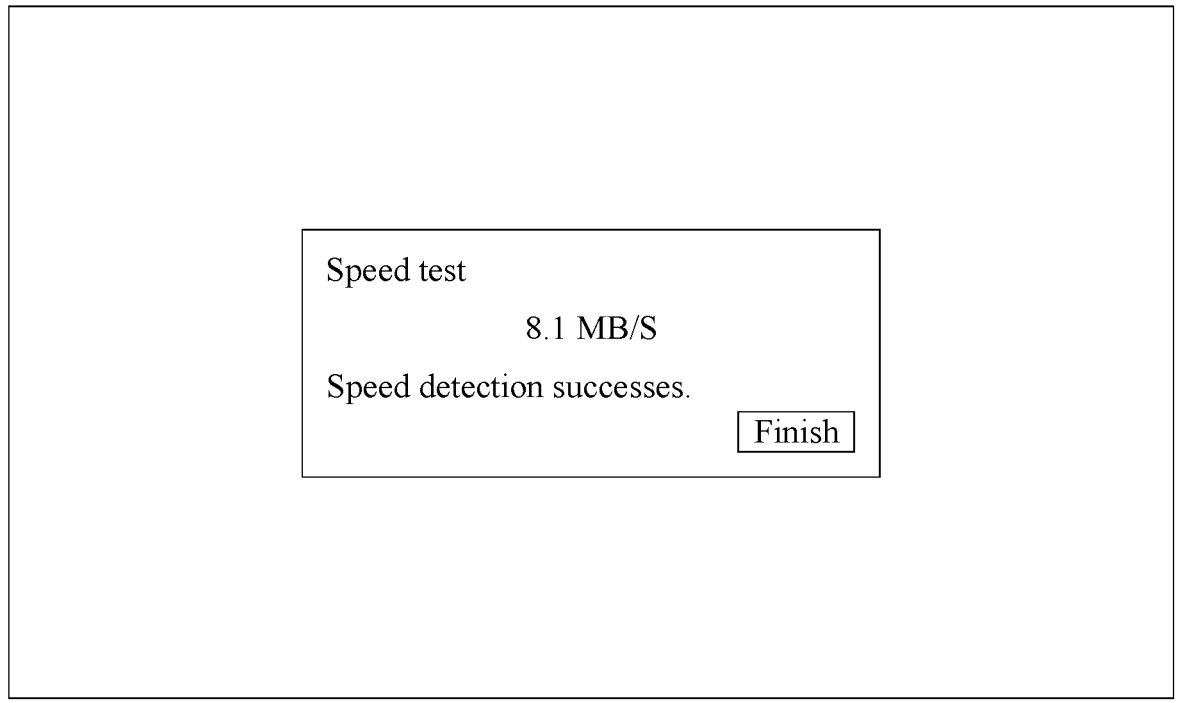
FIG. 8 shows a schematic diagram of a registration interface of a memory according to some embodiments.

In some embodiments, during registering of the memory, the display apparatus may detect memory parameters that affect video recording, such as the capacity control and access speed of the memory, and the access speed may be the last memory parameter for detection. Referring to FIG. 8, after the detection of the access speed is completed, the access speed detection interface may display the access speed of the memory and the "completed" control. The user may click the "completed" control in FIG. 8 to exit the access speed detection interface.

S127: setting a registered memory as the target memory.

In some embodiments, upon registration of memory in S126, the display apparatus may set one of the registered memories as the target memory for the video recording application.

S130: starting video recording, and storing a recorded video in the target memory.

In some embodiments, the video recording application may be configured to start video recording after determining the target memory, and store the recorded video in the target memory.

Figure 9:
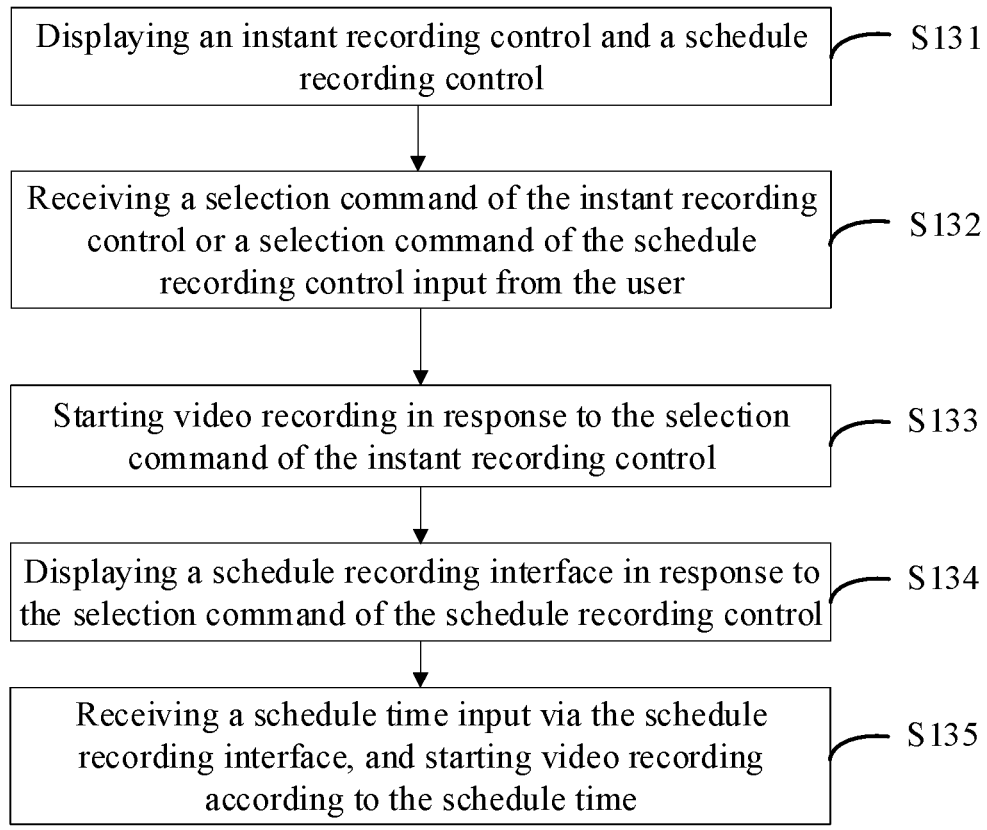
FIG. 9 shows a schematic flowchart of a method for starting video recording according to some embodiments.

In some embodiments, the video recording application supports instant recording mode and schedule recording mode. In this case, the method for starting video recording may refer to FIG. 9, including steps S131-S135.

S131: displaying an instant recording control and a schedule recording control.

In some embodiments, the display apparatus may generate and display a recording mode selection interface after determining the target memory, and the recording mode selection interface may display an instant recording control and a schedule recording control, and the instant recording control may be configured to start video recording in response to a selection of the instant recording control, and the schedule recording control may be configured to generate and display a setting interface of schedule recording in response to a selection of the schedule recording control.

S132: receiving a selection command of the instant recording control or a selection command of the schedule recording control input from the user.

In some embodiments, the user may click the instant recording control on the recording mode selection interface to input the selection command of the instant recording control to the display apparatus.

S133: starting video recording in response to the selection command of the instant recording control.

In some embodiments, the user may click the instant recording control on the recording mode selection interface to input the selection command of the instant recording control to the display apparatus.

S134: displaying a schedule recording interface in response to the selection command of the schedule recording control.

In some embodiments, the user may click the schedule recording control on the recording mode selection interface to input the selection command of the schedule recording control to the display apparatus. The display apparatus may generate and display the setting interface of schedule recording in response to the selection command of the schedule recording control.

S135: receiving a schedule time input via the schedule recording interface, and starting video recording according to the schedule time.

Figure 10:
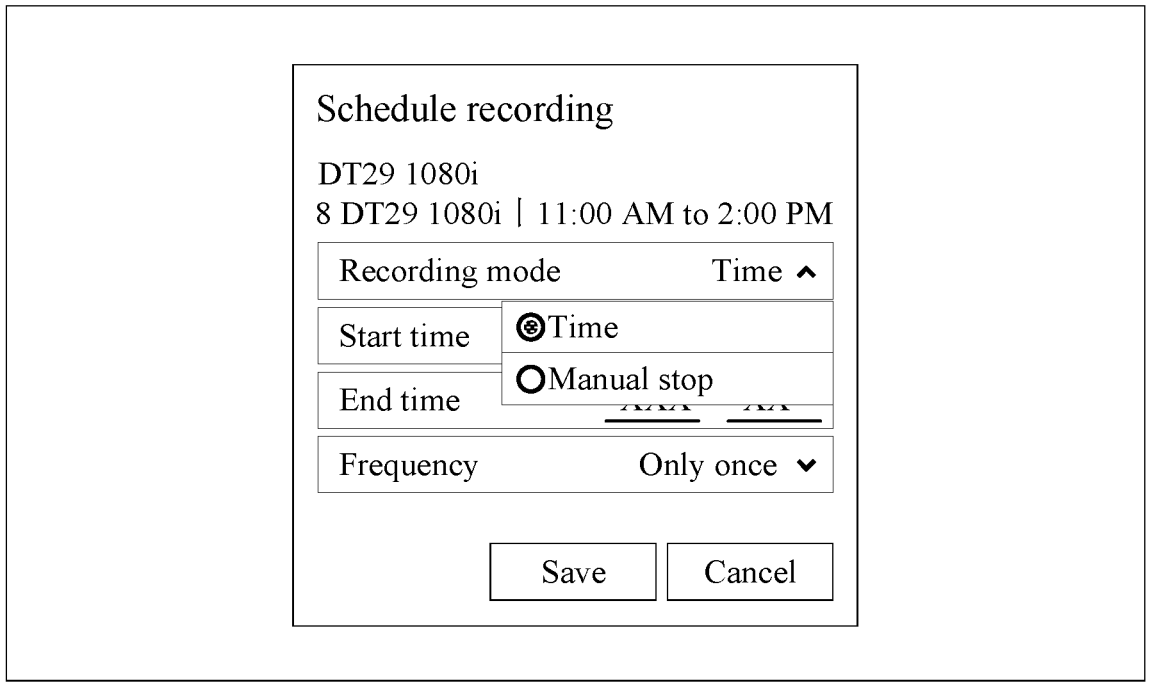
FIG. 10 shows a schematic diagram of a setting interface of schedule recording according to some embodiments.

In some embodiments, the setting interface of schedule recording may refer to FIG. 10. As shown in FIG. 10, the user may input the schedule time in the schedule recording interface, where the schedule time may include a start time and an end time of the video recording. The user may click the "Save" control on the schedule recording interface to complete the setting of the schedule time.

In some embodiments, after the user clicks the "Save" control on the schedule recording interface, the display apparatus may save the schedule time input from the user and perform video recording according to the schedule time.

Figure 11:
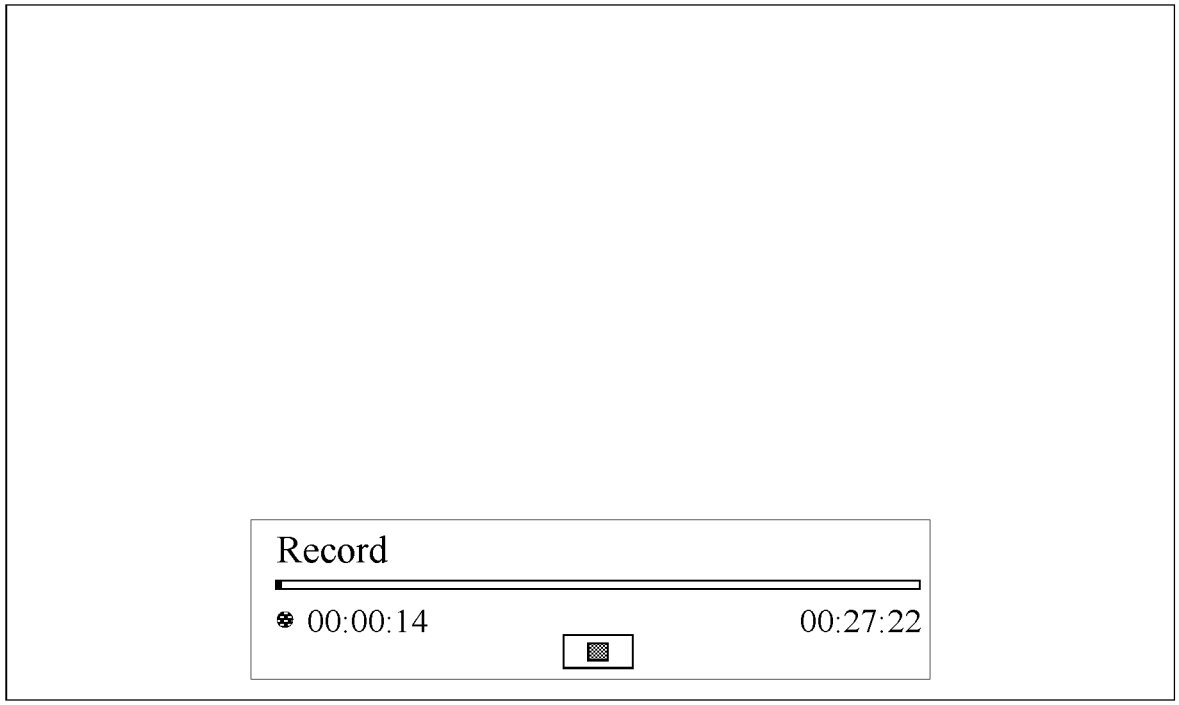
FIG. 11 shows a schematic diagram of a video recording interface of a display apparatus according to some embodiments.

In some embodiments, the recording interface after the display apparatus starts video recording may be as shown in FIG. 11, which is a schematic diagram of the video recording interface according to some embodiments. As shown in FIG. 11, the video recording interface may present a recording progress menu, which may display the recording duration and the total recording duration, and the total recording duration may be obtained by subtracting the recording start time from the recording end time input from the user.

In some embodiments, the display apparatus may be configured to close the video recording application after the video recording ends.

In some embodiments, the display apparatus may be configured to enter an interface for presenting a list of recorded file(s) after the video recording ends.

In some embodiments, the display apparatus may be configured to display a list control for presenting a list of recorded file(s) in response to a command for launching the video recording application from the user, the list control may be configured to generate a request for a list of recorded file(s) in response to being selected, and the display apparatus may display a list of recorded file(s) in response to the request for the list of recorded file(s).

Figure 12:
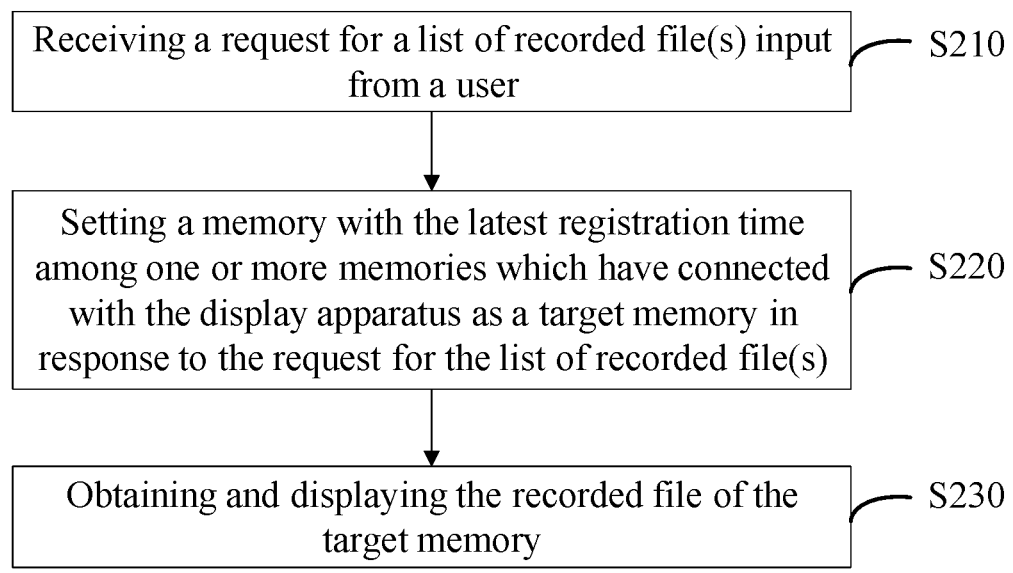
FIG. 12 shows a schematic flowchart of a display method for a recorded file according to some embodiments.

In some embodiments, the method for displaying a recorded file on the display apparatus may refer to FIG. 12, including steps S210-S230.

S210: receiving a request for a list of recorded file(s) input from a user.

In some embodiments, the user may input the request for a list of recorded file(s) to the display apparatus by clicking the list control.

S220: setting a memory with the latest registration time among one or more memories which have connected with the display apparatus as a target memory in response to the request for the list of recorded file(s).

In some embodiments, after receiving the request for the list of recorded file(s), the display apparatus needs to select one of the memories in connection with the display apparatus as the target memory and display a recorded file in the target memory. The method for determining the target memory by the display apparatus may refer to FIG. 6, and will omit here.

S230: obtaining and displaying the recorded file of the target memory.

In some embodiments, the recorded file made by the video recording application may be in a fixed storage format, and the display apparatus may search the target memory for files in this storage format upon determining the target memory, and display a list of recorded file(s) according to the recorded files found.

In some embodiments, the recorded files made by the video recording application may be stored under a preset storage path, and the display apparatus may search for the recorded files in the preset storage path upon determining the target storage, and display a list of recorded file(s) according to the recorded files found.

In some embodiments, after the user schedules video recording through the video recording application, the video recording application may store the schedule of video recording.

Figures 13, 14:
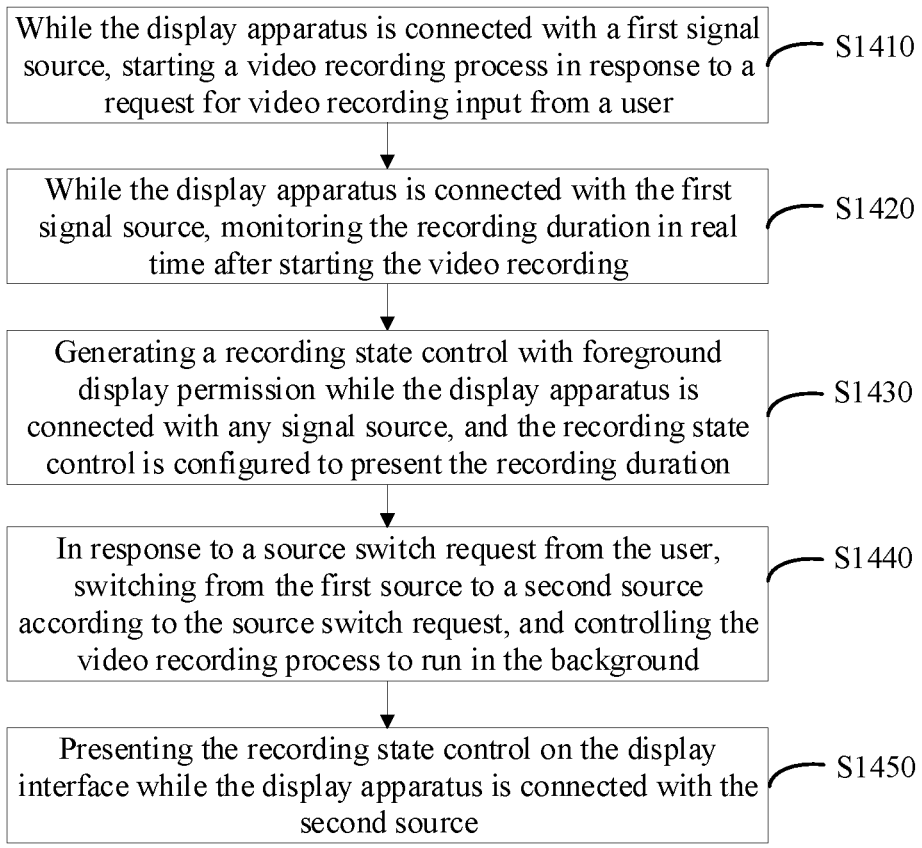
FIG. 13 shows a schematic diagram of a recorded file interface according to some embodiments.
FIG. 14 shows a schematic flowchart of a video recording method according to some embodiments.

In some embodiments, the recorded file interface may refer to FIG. 13. As shown in FIG. 13, the recorded file interface may display a "Recorded" control and a "Scheduled" control. The display apparatus may generate the recorded file interface after obtaining the recorded file and the scheduling record of video recording. The user may click the "Recorded" control to view the recorded file, and click the "Scheduled" control to view the scheduling record.

In some embodiments, while the display apparatus displays the recorded file interface, if the user inserts a memory into the display apparatus, the display apparatus may determine whether the inserted memory is the memory corresponding to the dynamic identifier in response to a memory insertion instruction. In response to the inserted memory being the memory corresponding to the dynamic identifier, the display is refreshed so that the display presents a recorded file in the memory corresponding to the dynamic identifier; otherwise, the display is controlled to continue displaying the recorded file in the target memory.

In some embodiments, while the display apparatus displays the recorded file interface, if the user removes a memory from the display apparatus, the display apparatus may determine whether the removed memory is the target memory in response to a memory removal instruction. In response to the removed memory being the target memory, the display is refreshed so that the display presents a recorded file in a memory in connection with the display apparatus; otherwise, the display is controlled to continue displaying the recorded file of the target memory.

As can be seen from the above-mentioned embodiments, in the embodiments of the disclosure, by storing the identifier of the latest registered memory on the display apparatus, the memory with the latest registration time can be selected from the memories which have connected with the display apparatus while a video is being recorded or a recorded file is being displayed, and this memory is used as the target memory for storing or displaying the video file. Since the user usually prefers to select a newly registered magnetic disk for video recording, the disclosure more conforms to actual demands of the user and improves the user experience compared to directly selecting the first memory which have connected with the display apparatus as the target memory.

In some embodiments, the display apparatus may support a plurality of signal sources, such as live broadcast sources and on-demand sources, and the live broadcast sources may include radio and television sources, and the on-demand sources may include Internet of things source. The user may switch sources through a remote control, to watch programs from different sources. After the user starts a video recording application under a signal source, if the signal source is switched, the video recording application will be converted from a foreground program to a background program. While watching a program from the switched source, the user may forget to close the video recording application in time, so that video recording application may continuously perform recording and thus occupy a large amount of storage space.

In view of the above technical problem, an embodiment of the disclosure provides a video recording method. Referring to FIG. 14, the method may include the following steps.

S1410: while the display apparatus is connected with a first signal source, starting a video recording process in response to a request for video recording input from a user.

In some embodiments, the first signal source may be a live broadcast source. When the source of the display apparatus is a live broadcast source, the user may input the request for video recording to the display apparatus through the remote control.

In some embodiments, a button for screen recording may be provided on the remote control of the display apparatus, and a selection signal of the button for screen recording may be used to generate the request for video recording; in some embodiments, a menu button may be provided on the remote control of the display apparatus, the menu button is pressed to call up a menu including a control for screen recording on the display apparatus, and a selection signal of the control for screen recording may be used to generate the request for video recording.

In some embodiments, the display apparatus generates the request for video recording in response to a selection signal of the button for screen recording or a selection signal of the control for screen recording, and starts the video recording application according to the request for video recording.

In some embodiments, the video recording application on the display apparatus supports only one recording mode, such as instant recording. After the video recording application is started, a video recording process may be initiated to start video recording.

Figure 15:
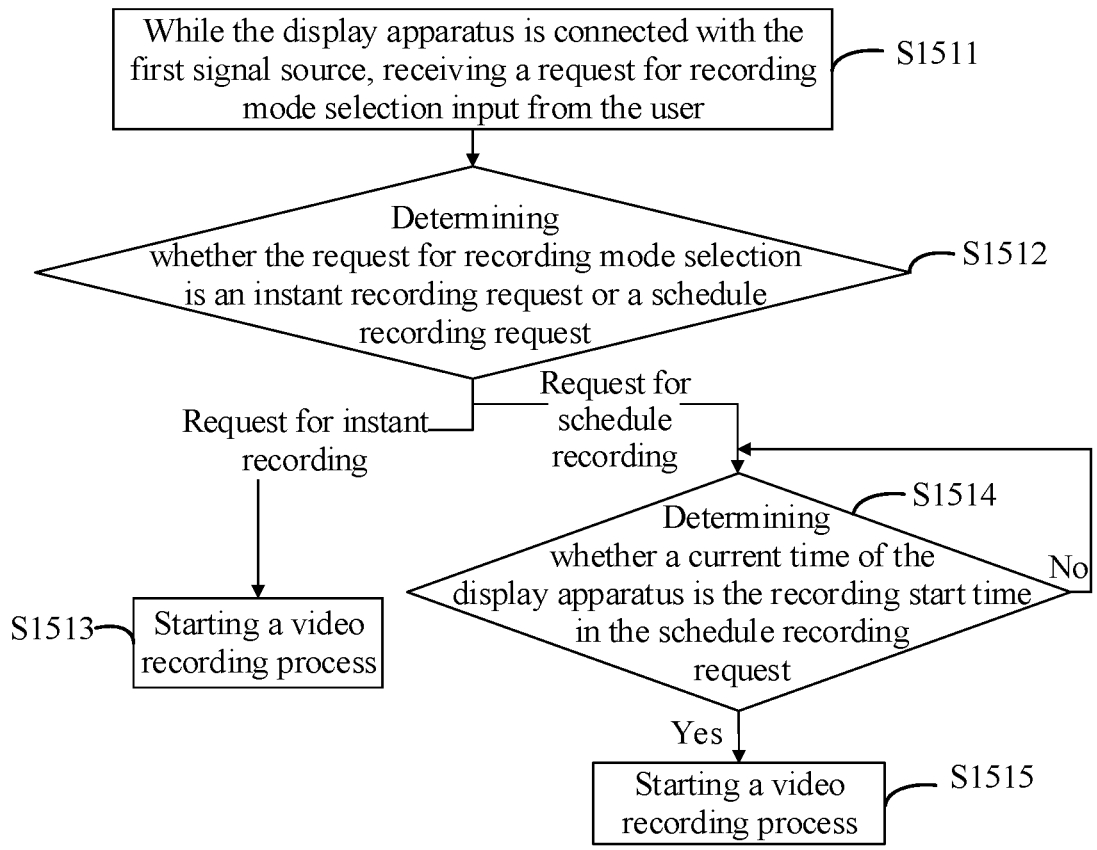
FIG. 15 shows a schematic flowchart of a method for starting a video recording process according to some embodiments.

In some embodiments, the video recording application on the display apparatus may support instant recording and schedule recording. When the video recording application supports instant recording and schedule recording, the method for starting the video recording process may refer to FIG. 15, including steps S1511-S1513.

S1511: while the display apparatus is connected with the first signal source, receiving a request for recording mode selection input from the user.

In some embodiments, after the video recording application is started, the video recording process may display an instant recording control for indicating instant recording mode and a schedule recording control for indicating schedule recording mode. The instant recording control may be configured to generate a request for instant recording in response to a selection of the control. The schedule recording control may be configured to pop up a setting interface of schedule recording in response to a selection of this control. The user may select or input the recording start time and recording end time in the setting interface of schedule recording, to generate a schedule recording request including the recording start time and recording end time. In some embodiments, the user may also input the recording duration in the setting interface of schedule recording, without inputting the recording end time. The schedule recording request and the instant recording request are both requests for recording mode selection.

S1512: determining whether the request for recording mode selection is an instant recording request or a schedule recording request.

In some embodiments, upon receiving the request for recording mode selection input from the user, the video recording application may determine whether the request is an instant recording request or a schedule recording request, for example, determine that the request is an instant recording request in response to the request not including any one or combination of the recording start time, recording end time and recording duration, and determine that the request is a schedule recording request in response to the request including the recording start time and the recording end time.

S1513: starting a video recording process in response to the request for recording mode selection being the instant recording request.

S1514: determining whether a current time of the display apparatus is the recording start time in the schedule recording request in response to the request for recording mode selection being the schedule recording request.

S1515: starting a video recording process in response to the current time being the recording start time.

In some embodiments, if the current time of the display apparatus is the recording start time, a video recording process is started; if the current time is not the recording start time, the video recording process is not started, and the flow goes back to S1514.

S1420: while the display apparatus is connected with the first signal source, monitoring the recording duration in real time after starting the video recording.

In some embodiments, the display apparatus may start a preset monitoring process based on the start of the video recording. In some embodiments, the monitoring process may alternatively be configured to be started by the video recording application. In some embodiments, the monitoring process may be a system-level process.

In some embodiments, the video recording process starts timing after being started, and the timing duration is the recording duration. The video recording process may report the recording duration to the monitoring process, so that the monitoring process can obtain the recording duration of the video recording process in real time.

In some embodiments, the monitoring process may also actively monitor the state of the video recording process, and the state of the video recording process may be active or inactive. Here, the video recording process being active indicates that the video recording process is performing the video recording, while the process being inactive indicates that the video recording process pauses or terminates the video recording. The monitoring process may obtain the recording duration of the video recording process according to the cumulative time during which the video recording process is active.

In some embodiments, the video recording process may generate a recording progress menu. The recording progress menu is configured to present a recording duration and a recording stop control for terminating recording, where the recording duration is updated in real time, and the recording stop control is configured to cause the video recording application to end recording in response to a selection of this control.

In some embodiments, the recording progress menu may be configured to be superimposed on the recording interface of the video recording application for display. When the current signal source of the display apparatus is the first signal source which is being recorded by the video recording application, if the video recording application is the foreground application of the display apparatus, the display apparatus may display the recording interface, and the user may see the recording progress menu on the recording interface. When the user presses the stop button on the remote control, the recording stop control may be selected, thereby causing the video recording application to end recording. When the current signal source of the display apparatus is not the first signal source recorded by the video recording application, for example, when the user switches the source to a second signal source, the video recording application is no longer the foreground application of the display apparatus, the display apparatus does not display the recording interface of the video recording application, and the user cannot see the recording progress menu.

S1430: generating a recording state control with foreground display permission while the display apparatus is connected with any signal source, and the recording state control is configured to present the recording duration.

In some embodiments, the monitoring process may generate a recording state control according to the recording duration, and the recording state control may be configured to present the recording duration.

In some embodiments, the recording state control is generated by a system-level program or process, similar to the monitoring process, and thus is able to have the foreground display permission no matter the display apparatus is connected with anyone signal source among all signal sources and is able to present at the foreground after the display apparatus switches from one signal source to another signal source. For example, the recording state control is generated by the main process of the display apparatus after the video recording is started or generated by the monitoring process of the display apparatus after the video recording is started, and the recording state control may be configured to be presented in a floating window on the current display interface of the display apparatus. In a scenario where the current source of the display apparatus is the first signal source recorded by the video recording application, if the video recording application is the foreground application of the display apparatus, the display apparatus may present the recording interface, and the user may see the recording state control on the recording interface. In a scenario where the current source of the display apparatus is not the first signal source recorded by the video recording application, for example, when the user switches from the first signal source to the second signal source, the video recording application is no longer the foreground program of the display apparatus, and the display apparatus does not display the recording interface of the video recording application, but the recording state control may continue being presented in the floating window on the current interface of the display apparatus, so that the user can see the recording state control.

S1440: in response to a source switch request from the user, switching from the first signal source to a second signal source according to the source switch request, and controlling the video recording process to run in the background.

In some embodiments, after starting the video recording while the display apparatus is connected with the first signal source, the user presses a source button on the remote control to switch the source of the display apparatus. In some embodiments, after starting the video recording while the display apparatus is working under the first signal source, the user presses a menu button on the remote control to call up a menu including a source switch control on the display apparatus, and a selection signal of the source switch control may be used to generate a source switch request.

In some embodiments, the display apparatus generates a source switch request in response to a selection signal of the source button or a selection signal of the source switch control, where the source switch request may include an identifier of a source to be switched, such as an identifier of the second signal source. The display apparatus switches from the first signal source to the second signal source according to the source switch request, and the second signal source may be an on-demand source.

In some embodiments, after switching from the first signal source to the second signal source, the display apparatus may control the video recording process to run in the background, so that the video recording application becomes a background application, and the video recording process can continue recording. While the foreground application is another application, such as a video-on-demand application, while the display apparatus is connected with the second signal source.

In some embodiments, after the display apparatus converts the video recording application into a background application, the monitoring process may continue monitoring the recording duration and state of the video recording process, thereby updating the recording state control in real time.

S1450: presenting the recording state control on the display interface while the display apparatus is connected with the second signal source.

In some embodiments, after the display apparatus switches to the second signal source, the recording state control may be presented in a floating window on the display interface associated with the second signal source, so that the user is able to see the recording state control on the display apparatus while the display apparatus is switched to the second signal source. The recording duration presented by the recording state control may prompt the user that the program of the first signal source is being recorded, thereby solving the problem that the user cannot obtain the video recording information after source switching.

In some embodiments, the recording state control may be configured to be able to adjust position. The user may press the screen recording button on the remote control to select the recording state control, and then press a direction key on the remote control to move the recording state control to a suitable position, for example, move to the top, side or bottom or other position at the display area of the display apparatus. In some embodiments, the recording state control may also be configured to be able to adjust size.

As can be seen, in the disclosure, by setting the recording state control to a system-level program or process, when the video recording application has no authority to be displayed in the foreground due to the source switch, the recording state control can still be presented on the current interface of the display apparatus, so that the user can check the recording progress at any time.

In some embodiments, after the user checks the recording progress of the first signal source through the recording state control while the display apparatus is working under the second signal source, if a user wants to end recording, he or she can press the source button on the remote control to switch the source of the display apparatus back to the first signal source, so that the video recording application is converted into the foreground application of the display apparatus, and the display apparatus displays the recording interface of the video recording application. The recording interface can present the recording progress menu, and the user can select the recording stop control in the recording progress menu, so that the video recording application stops video recording.

In some embodiments, if the user wants to end recording while the display apparatus is working under the second signal source, he or she can press the screen recording button, and the display apparatus ends the video recording process configured during working under the first signal source according to the selection command of the screen recording button. The video recording process may be configured to automatically save the recorded video upon the process being stopped.

In order to further describe the video recording method on the display apparatus, FIG. 16 to FIG. 19 show schematic diagrams of some interfaces of the display apparatus. The interfaces shown in FIG. 16 to FIG. 19 do not show the display content of the first signal source or the second signal source, but only illustrate the display of some controls or menus.

Figure 16:
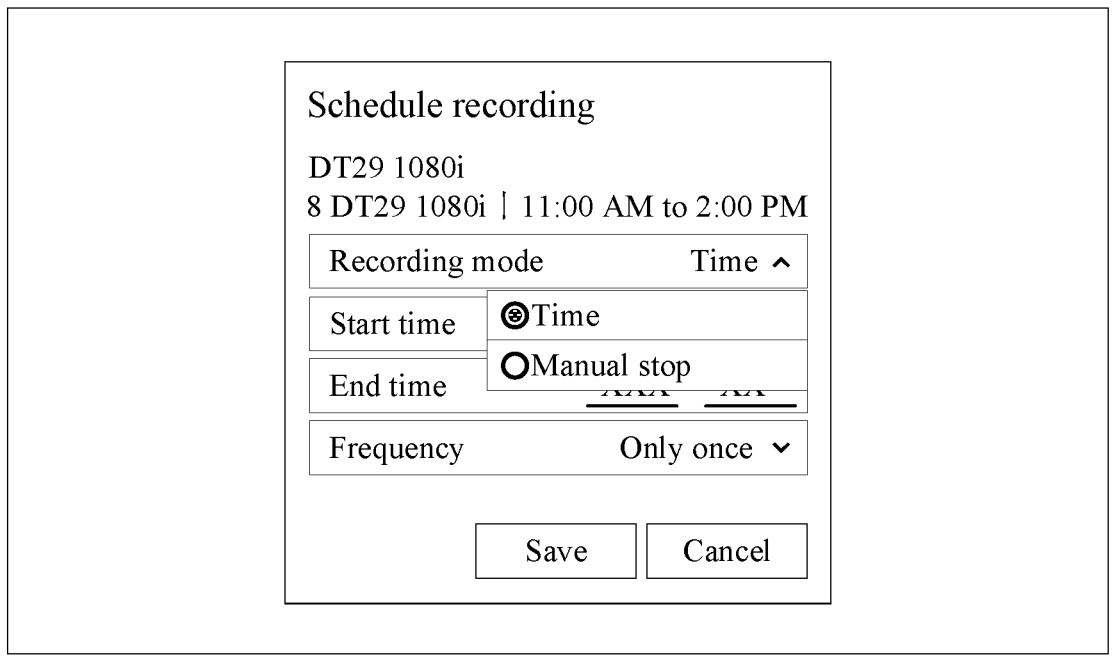
FIG. 16 shows a schematic diagram of a setting interface of schedule recording according to some embodiments.

Referring to FIG. 16, it is a schematic diagram of a setting interface of schedule recording according to some embodiments. As shown in FIG. 16, in some embodiments, the setting interface of schedule recording may be provided with a recording mode control, a start time control, an end time control, a frequency control, a save control and a cancel control, and the recording mode control is configured to pop up a time option control and a manual stop option control in response to a selection of the recording mode control, the time option control is configured to end recording at the recording end time input from the user in response to being selected, and the manual stop option control is configured to continue recording in response to being selected and end recording until the user selects the recording stop control in the recording progress menu. The frequency control is configured to pop up frequency option controls such as an once-only option control, an everyday option control, an every Monday option control, an every Tuesday option control, an every Thursday option control and an every Friday option control in response to being selected, where the frequency option control is configured to start recording at a specific time in response to being selected.

Figure 17:
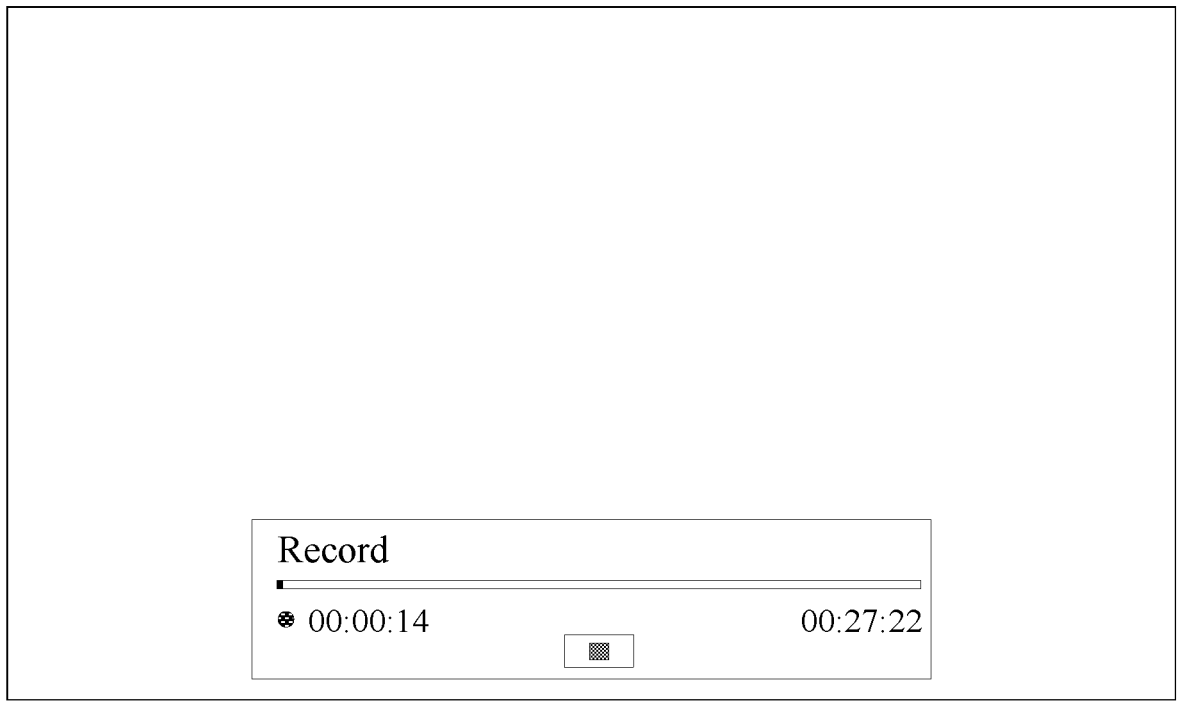
FIG. 17 shows a schematic diagram of a recording interface according to some embodiments.

Referring to FIG. 17, it is a schematic diagram of a recording interface according to some embodiments. As shown in FIG. 17, the recording interface may present a recording progress menu, which may include the recording duration and the total recording duration, and the total recording duration may be obtained by subtracting the recording start time from the recording end time input from the user.

In some embodiments, the recording progress menu may be configured to close automatically after displaying the second preset time, and the second preset time may be 10 seconds.

In some embodiments, while the current display interface of the display apparatus is the recording interface, the user may press the back button on the remote control, and the display apparatus closes the recording progress menu in response to reception of a selection command of the back button.

Figure 18:
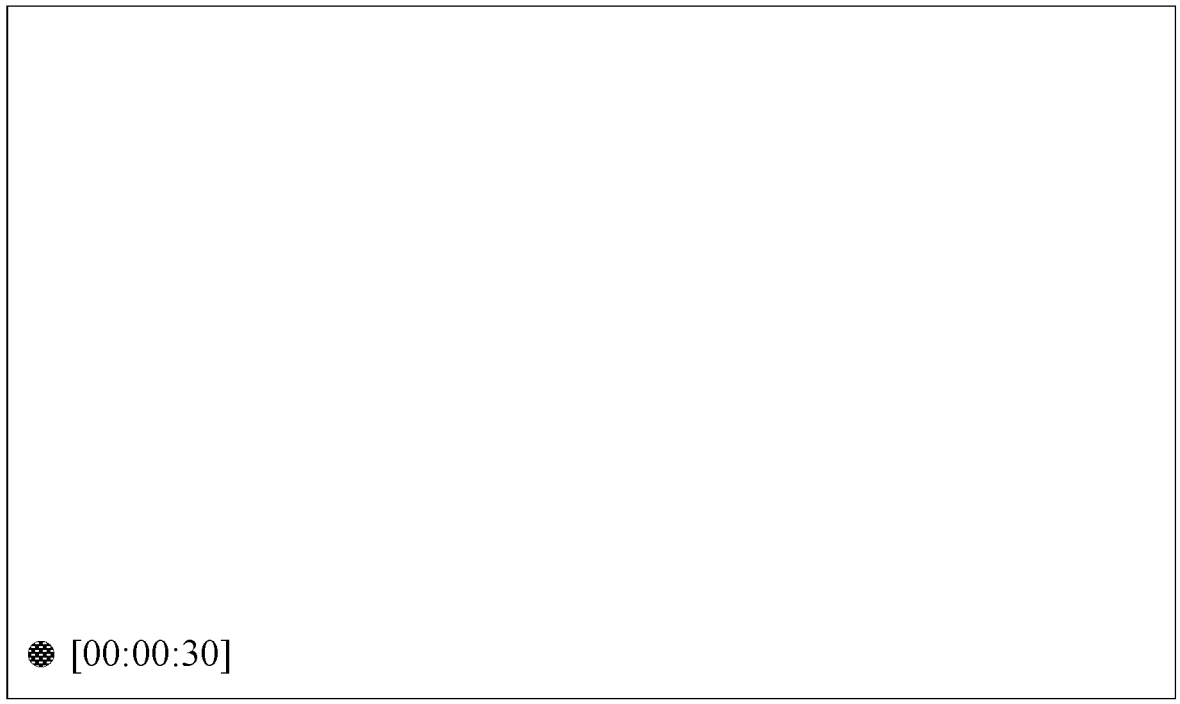
FIG. 18 shows a schematic diagram of a recording interface according to some embodiments.

In some embodiments, after the main process or monitoring process of the display apparatus detects that the recording progress menu is closed, the recording state control may be suspended and displayed on the display interface while the display apparatus is connected with the first signal source, as shown in FIG. 18.

Referring to FIG. 18, it is a schematic diagram of a recording interface according to some embodiments. As shown in FIG. 18, the recording state control may be displayed when the display apparatus does not display the recording progress menu in the recording process. In some embodiments, the recording state control may display the recording duration. In FIG. 18, the recording duration is 00:00:30, meaning that the recording duration is 30 seconds.

In some embodiments, while the display apparatus is connected with the first signal source, when the user switches from this source to another source, the display apparatus may switch the recording progress menu shown in FIG. 17 to the recording state control shown in FIG. 18, that is, the design of the recording state control presenting under the first signal source and the recording state control presenting under the second signal source may both be shown as in FIG. 18, which presents a small dot and the recording duration.

Figure 19:
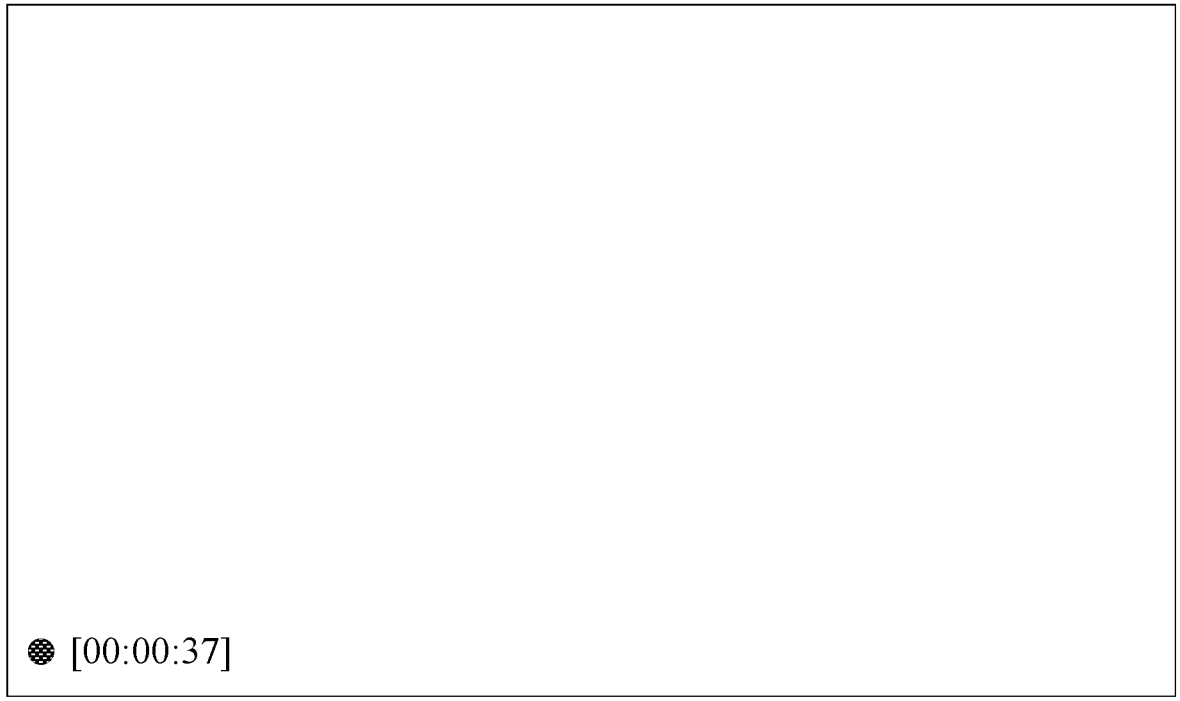
FIG. 19 shows a schematic diagram of a recording interface according to some embodiments.

In some embodiments, the main process or monitoring process of the display apparatus may reduce the transparency of the recording state control after the recording state control being presented for a first preset time, as shown in FIG. 19. As can be seen, the transparency of the recording state control is reduced compared with that in FIG. 18, and the first preset time may be 5 seconds.

In some embodiments, under the first signal source, the recording progress menu may be converted from FIG. 17 to the recording state control shown in FIG. 18 after the recording progress menu shown in FIG. 17 is displayed for a second preset time, and the recording state control may be changed from FIG. 18 to that shown in FIG. 19 after the first preset time. After the first signal source is switched to a second signal source, if the display interface before source switch presents the recording progress menu shown in FIG. 17, then the display interface after source switch presents the recording state control shown in FIG. 18; if the display interface before source switch presents the recording state control shown in FIG. 18, then the display interface after source switch presents the recording state control shown in FIG. 19; if the display interface before source switch presents the recording state control shown in FIG. 19, then the display interface after source switch presents the recording state control shown in FIG. 18; and under the second signal source, the recording state control may be changed from FIG. 18 to that shown in FIG. 19 after the recording state control shown in FIG. 18 is displayed for the first preset time.

As shown in FIG. 19, after the transparency of the recording state control is reduced, the visual interference to the display content of the display apparatus can be reduced. In some embodiments, the transparency of the recording state control may be configured to be reduced to 50%, and of course, may also be configured to be reduced to other value.

In some embodiments, under the first signal source, after the user presses the screen recording button on the remote control to start the video recording application, the recording mode may be selected. After the user selects the schedule recording, the setting interface of schedule recording as shown in FIG. 16 may be entered; the user may set the schedule recording time on the setting interface shown in FIG. 16; when the recording start time is reached, the recording interface shown in FIG. 17 may be entered; the user may press the back button on the remote control to enter the recording interface shown in FIG. 18, or after an interval of 10 seconds, the interface shown in FIG. 17 may be automatically switched to the interface shown in FIG. 18; and after another interval of 5 seconds, the interface shown in FIG. 18 may be automatically switched to the interface shown in FIG. 19. When the user presses the screen recording button or the OK button on the remote control, the user may enter FIG. 17 from FIG. 19.

In some embodiments, under the first signal source, when the current display interface is any interface in FIGS. 17-19, the user switches the source of the display apparatus and may enter the interface shown in FIG. 18. In this case, the source of the display apparatus has been switched to the second signal source; and the interface shown in FIG. 18 may be automatically switched to the interface shown in FIG. 19 after an interval of 5 seconds. If the user needs to end recording, he or she can switch from the second signal source to the first signal source, enter the interface shown in FIG. 17, and select the recording stop control to end recording.

As can be seen from the above embodiments, in the embodiments of the disclosure, a recording state control with foreground display permission under all sources is generated after the video recording process is started, so that the user can see the recording state control on the display interface of the switched source after switching the source, solving the problem that the recording information cannot be viewed after switching the source, preventing the recorded video from occupying a large amount of storage space of the magnetic disk due to continuous recording, and improving the video recording experience of the user; and the recording information is presented by the recording state control, which almost has no influence for viewing effect of the user under the switched source.

Since the above embodiments are all cited and combined with other embodiments for description, different embodiments all have the same parts, and the same or similar parts among various embodiments in the specification can refer to each other, which will not be described in detail here.

After considering the specification, those skilled in the art will readily come up with other embodiments of the disclosure. The disclosure is intended to encompass any variations, adaptable modifications of the disclosure, and these variations, modifications follow the general principle of the disclosure and include the common knowledge or customary technological means in the technical field which is not disclosed in this application. The specification and embodiments are only for illustration, and the protection scope and spirit of the disclosure are defined by the claims.

The above embodiments of the disclosure do not intend to limit the protection scope of the disclosure.

What is claimed is:

1. A display apparatus, comprising:
a display for displaying an image from at least one of a broadcast system or network, and a user interface;
a plurality of applications comprising a video recording application; and
a controller in communication with the display and the plurality of applications; wherein the controller is configured to:
while the display apparatus is working under a first signal source, present first content from the first signal source;
during presentation of the first content, in response to a selection of the video recording application, start a video recording process associated with the first content and monitor recording duration of the video recording process;
generate a recording state control with foreground display permission while the display apparatus is connected with any signal source, wherein the recording state control is configured to present the recording duration;
in response to a source switch request from a user, switch from the first signal source to a second signal source according to the source switch request, present second content from the second signal source, and control the video recording process to run in the background; and
present the recording state control on a display interface with the second content.

2. The display apparatus according to claim 1, the controller is configured to:
change a presentation style of the recording state control after the recording state control being presented for a first preset time.

3. The display apparatus according to claim 1, the controller is configured to:
while the display apparatus is working under the first signal source, present a recording progress menu, wherein recording progress menu is configured to present a recording duration and a recording stop control for terminating recording, and the recording duration is updated in real time.

4. The display apparatus according to claim 3, the controller is configured to:
close the recording progress menu after presentation for a second preset time; and
present the recording state control on a display interface of the display apparatus working under the first signal source.

5. The display apparatus according to claim 1, the controller is configured to:
while the display apparatus is working under the first signal source, start the video recording process in response to a request for video recording input from a user via a remote control.

6. The display apparatus according to claim 1, the controller is configured to:
while the display apparatus is working under the first signal source, receive a request for recording mode selection input from the user;
determine whether the request for recording mode selection is an instant recording request or a schedule recording request;
start the video recording process in response to the request for recording mode selection being the instant recording request;

determine whether a current time of the display apparatus is a recording start time in the schedule recording request in response to the request for recording mode selection being the schedule recording request;

start the video recording process in response to the current time being the recording start time.

7. The display apparatus according to claim 1, the controller is configured to:
while the display apparatus is working under the second signal source, in response to the source switch request input from the user, remove the recording state control from the display interface of the first signal source.

8. The display apparatus according to claim 1, the controller is configured to:
while the display apparatus is working under the first signal source, in response to a selection signal of the recording state control input from the user, remove the recording state control from the display interface of the first signal source;
present a recording progress menu on the display interface of the first signal source, wherein recording progress menu is configured to present a recording duration and a recording stop control for terminating recording, and the recording duration is updated in real time.

9. The display apparatus according to claim 1, the controller is configured to:
before starting the video recording process, set a memory with latest registration time among one or more memories in connection with the display apparatus as a target memory for the video recording process.

10. A method for a display apparatus, comprising:
while the display apparatus is working under a first signal source, presenting first content from the first signal source, wherein the display apparatus comprises a display for displaying an image from at least one of a broadcast system or network, and a user interface and a plurality of applications comprising a video recording application;
during presentation of the first content, in response to a selection of the video recording application, starting a video recording process associated with the first content and monitor recording duration of the video recording process;
generating a recording state control with foreground display permission while the display apparatus is connected with any signal source, wherein the recording state control is configured to present the recording duration;
in response to a source switch request from a user, switch from the first signal source to a second signal source according to the source switch request, presenting second content from the second signal source, and controlling the video recording process to run in the background; and
presenting the recording state control on a display interface with the second content.

11. The method according to claim 10, the method further comprising:
changing a presentation style of the recording state control after the recording state control being presented for a first preset time.

12. The method according to claim 10, the method further comprising:
while the display apparatus is working under the first signal source, presenting a recording progress menu, wherein recording progress menu is configured to present a recording duration and a recording stop control for terminating recording, and the recording duration is updated in real time.

13. The method according to claim 12, the method further comprising:
closing the recording progress menu after presentation for a second preset time; and
presenting the recording state control on a display interface of the display apparatus working under the first signal source.

14. The method according to claim 10, the method further comprising:
while the display apparatus is working under the first signal source, starting the video recording process in response to a request for video recording input from a user via a remote control.

15. The method according to claim 10, the method further comprising:
while the display apparatus is working under the first signal source, receiving a request for recording mode selection input from the user;
determining whether the request for recording mode selection is an instant recording request or a schedule recording request;
starting the video recording process in response to the request for recording mode selection being the instant recording request;
determining whether a current time of the display apparatus is a recording start time in the schedule recording request in response to the request for recording mode selection being the schedule recording request;
starting the video recording process in response to the current time being the recording start time.

16. The method according to claim 10, the method further comprising:
while the display apparatus is working under the second signal source, in response to the source switch request input from the user, removing the recording state control from the display interface of the first signal source.

17. The method according to claim 10, the method further comprising:
while the display apparatus is working under the first signal source, in response to a selection signal of the recording state control input from the user, removing the recording state control from the display interface of the first signal source;
presenting a recording progress menu on the display interface of the first signal source, wherein recording progress menu is configured to present a recording duration and a recording stop control for terminating recording, and the recording duration is updated in real time.

18. The method according to claim 10, the method further comprising:
before starting the video recording process, setting a memory with latest registration time among one or more memories in connection with the display apparatus as a target memory for the video recording process.

* * * * *